(12) United States Patent
Phatak et al.

(10) Patent No.: US 9,701,243 B1
(45) Date of Patent: Jul. 11, 2017

(54) HEATSTROKE SAFETY SYSTEM (71) Applicant: Intel Corporation, Santa Clara, CA (US)

(72) Inventors: Gauri Phatak, Portland, OR (US); Swarnendu Kar, Hillsboro, OR (US); Biwei Guo, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/757,855

(22) Filed: Dec. 26, 2015

(51) Int. Cl.
*B60Q 1/00* (2006.01)
*B60Q 9/00* (2006.01)
*G08B 21/02* (2006.01)

(52) U.S. Cl.
CPC ............ *B60Q 9/00* (2013.01); *G08B 21/02* (2013.01)

(58) Field of Classification Search
None
See application file for complete search history.

(56) References Cited

U.S. PATENT DOCUMENTS

| | | | |
|---|---|---|---|
| 8,655,547 B1 * | 2/2014 | Steele | 701/36 |
| 9,384,647 B1 * | 7/2016 | Arnold et al. | 340/457 |
| 2002/0161501 A1 * | 10/2002 | Dulin | B06B 1/0215 701/45 |
| 2012/0323763 A1 * | 12/2012 | Michael | G06Q 30/02 705/39 |
| 2015/0306940 A1 * | 10/2015 | Salter | B60J 7/0573 701/49 |
| 2016/0049061 A1 * | 2/2016 | Scarborough | B60N 2/002 340/449 |
| 2016/0075296 A1 * | 3/2016 | Alderman | G08G 1/127 340/989 |

* cited by examiner

*Primary Examiner* — Brent Swarthout
(74) *Attorney, Agent, or Firm* — Alpine Technology Law Group LLC (57) ABSTRACT

In one example an electronic device comprises a plurality of sensors comprising at least one of a motion sensor, a location sensor, a temperature sensor, and an air quality sensor and a controller comprising processing circuitry to determine, based on inputs from at least one of the motion sensor, the location sensor, the temperature sensor, or the air quality sensor, whether a dangerous condition exists in a region proximate the electronic device and in response to a determination that a dangerous condition exists in a region proximate the electronic device, to generate a warning signal. Other examples may be described.

12 Claims, 9 Drawing Sheets

HEATSTROKE SAFETY SYSTEM

BACKGROUND

The subject matter described herein relates generally to the field of electronic devices and more particularly to a vehicular heatstroke safety system.

There have been over 600 heatstroke deaths of children left in vehicles in the United States since 1998. Approximately half of such deaths are caused by a caregiver forgetting or otherwise leaving a child in a car seat. Accordingly, heatstroke safety systems may find utility.

BRIEF DESCRIPTION OF THE DRAWINGS

The detailed description is described with reference to the accompanying figures.

DETAILED DESCRIPTION

Described herein are examples of a heatstroke safety systems and methods to implement combinable image input devices in electronic devices. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

As described above, it may be useful to provide a heatstroke safety system which may be used in vehicles. In some examples described herein a heatstroke safety system may comprise one or more smart sensors which may trigger one or more alerts. Smart sensors may collect data such as ambient temperature, concentration of elements such carbon-dioxide and/or carbon monoxide in the air, and accelerometer and/or location sensors to accurately determine whether a car is occupied and environmental conditions inside a vehicle or other structure in which humans or animals may reside. As used herein, the term vehicle should be construed broadly to include cars, trucks, ships, aircrafts, spacecrafts, trains, buses or any form of transportation in which humans or animals may reside. In the event occupancy is detected and potential heatstroke conditions are identified, a warning signal may cause an alert module to implement one or more alerts.

Further structural and operational details will be described with reference to FIGS. 1-10, below.

Figure 1:
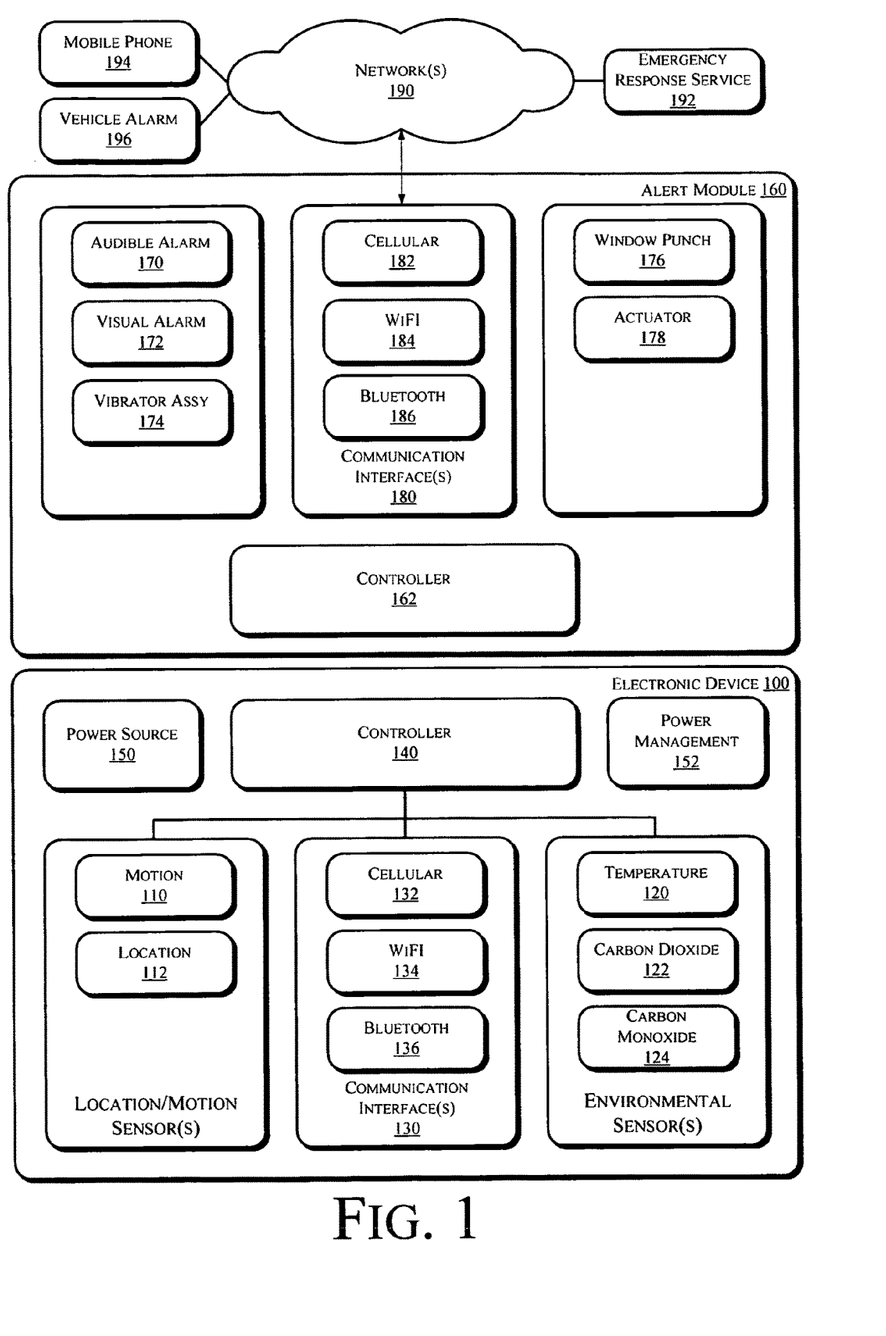
FIG. 1 is a schematic illustration of a heatstroke safety system in accordance with some examples.

FIG. 1 is a schematic illustration of a heatstroke safety system in accordance with some examples. In various examples, a heatstroke safety system may comprise an electronic device 100 comprising a plurality of sensors comprising at least one of a motion sensor 110 and a location sensor 112. In some examples motion sensor 110 may be implemented using an accelerometer, magnetometer, orientation sensor, a gyrometer, or similar device. Location sensor 112 may be implemented using a proximity detector, cellular network identifier, a WiFi identifier, or a global navigation satellite system (GNSS) receiver, or similar device.

Electronic device 100 may further include a temperature sensor 120, and one or more air quality sensors such as a carbon dioxide sensor 122 and/or a carbon monoxide sensor 124.

Electronic device 100 may further include one or more communication interfaces 130, e.g. a cellular interface 132, a WiFi interface 134, or Bluetooth interface 136. Communication interfaces 130 may implement one or more wireless communication connections via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Electronic device may further include a controller 140 communicatively coupled to the plurality of sensors. Electronic device 210 may further include one or more processors 224 and a memory module 240. As used herein, the term "controller" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. In one example, controller 140 may be embodied as an Intel® Atom™ processors, Intel® Atom™ based System-on-a-Chip (SOC) or Intel® Core2 Duo® or i3/i5/i7 series processor available from Intel Corporation, Santa Clara, Calif., USA. Also, one or more processors from other manufactures may be utilized. Moreover, the processors may have a single or multi core design.

Electronic device 100 may further include a power source 150 (e.g., one or more batteries) and a power management module 152 comprising processing circuitry to monitor a power level of the power source and to generate a warning signal when the power level of the power source falls below a threshold.

The system may further include an alert module 160. In the example depicted in FIG. 1 alert module 160 comprises a controller 162, which may be similar to controller 140 and one or more communication interfaces 180, e.g. a cellular interface 182, a WiFi interface 184, or Bluetooth interface 186. Alert module may comprise a an audible alarm 170, e.g., a siren, whistle or the like, a visual alarm 172, e.g., a strobe light, alarm light, or the like. Alert module 160 may further comprise a vibrator assembly 174, e.g., an impact hammer or a vibrator, a window punch 176 and an actuator.

In some examples the alert module 160 may be physically integrated in a single housing with the electronic device 100. In other examples the alert module 160 may be physically separate from the electronic device 160 and may be communicatively coupled to the electronic device 100 via the communication interfaces 130, 180. Further, communication interfaces 130, 180 may provide communication capabilities to one or more remote devices via a network 190. Example devices may include an emergency response service 192, a mobile phone 194, or a vehicle alarm 196.

Figure 2:
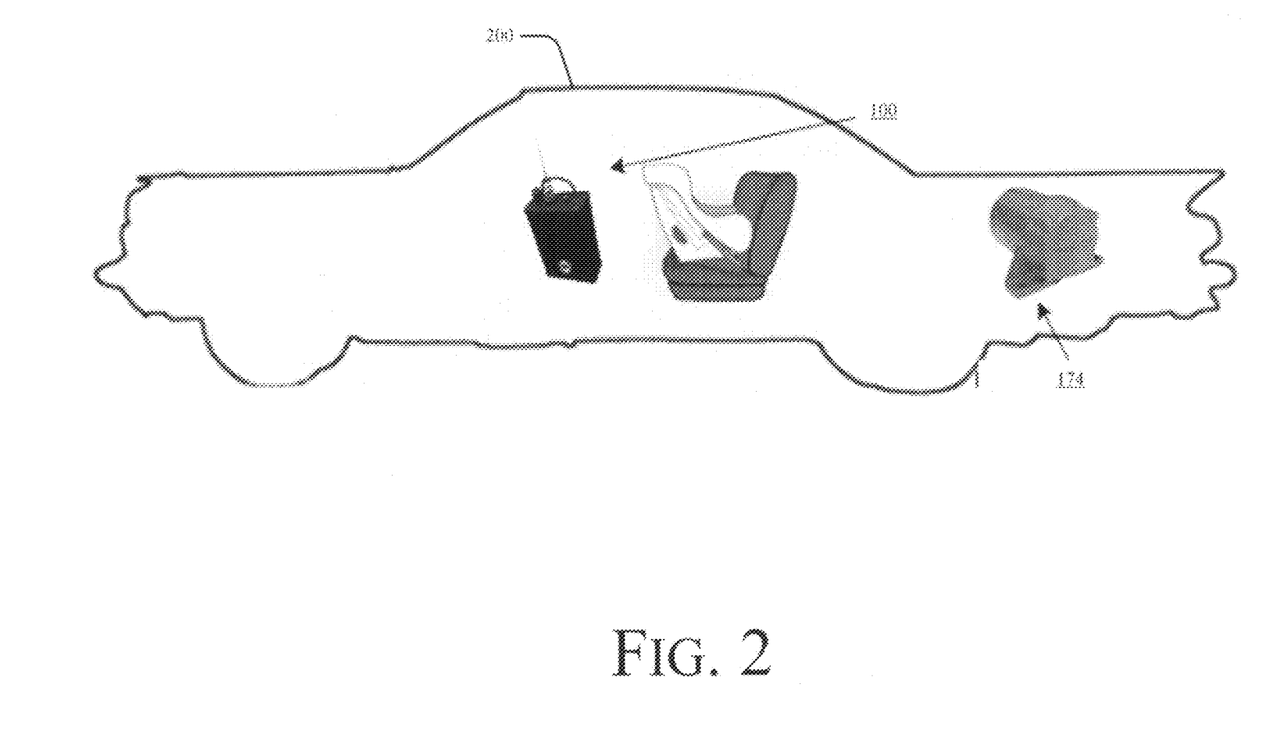
FIG. 2 is a schematic illustration of a heatstroke safety system in accordance with some embodiments.

FIG. 2 is a schematic illustration of a heatstroke safety system in accordance with some embodiments. In the example depicted in FIG. 2 the electronic device 100 may be positioned in the cabin of a vehicle 200, e.g., an automobile and the alert module may include a vibrator assembly 174 mounted elsewhere in the vehicle 200, e.g., in engine bay, underneath the driver side seat, or in the trunk.

Figure 3:
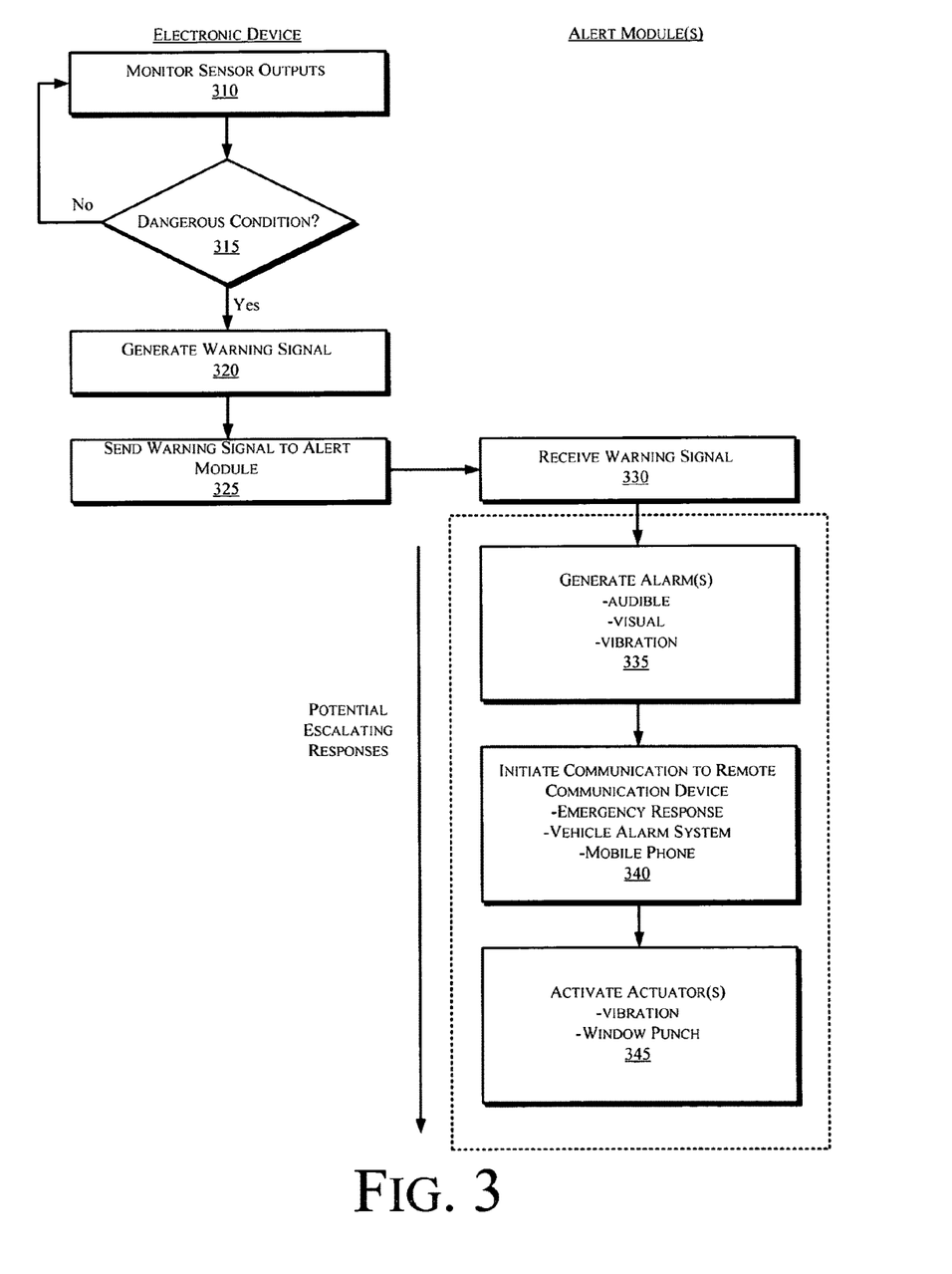
FIGS. 3-5 are flowcharts illustrating operations of a heatstroke safety system in accordance with some examples.
Figure 4:
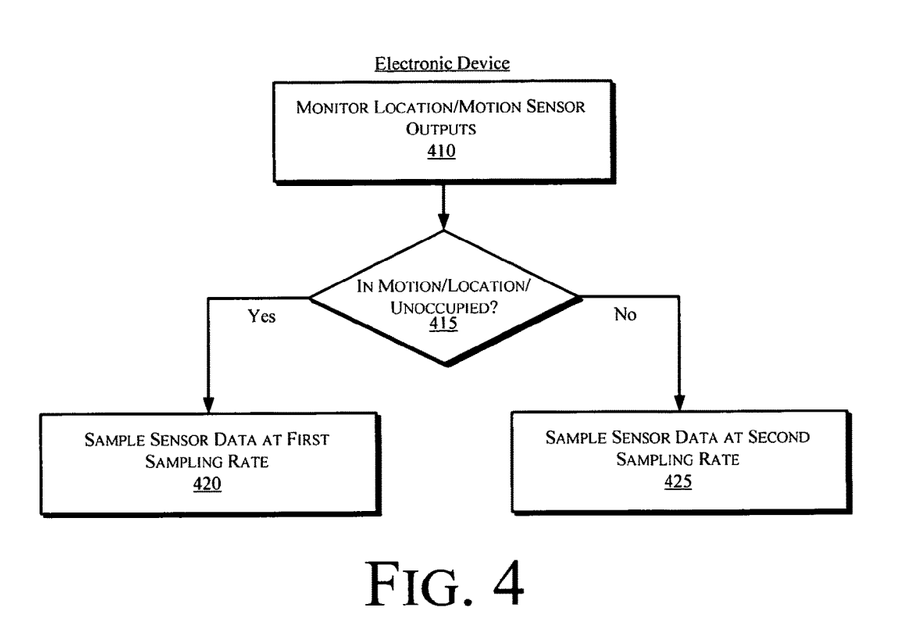
Figure 5:
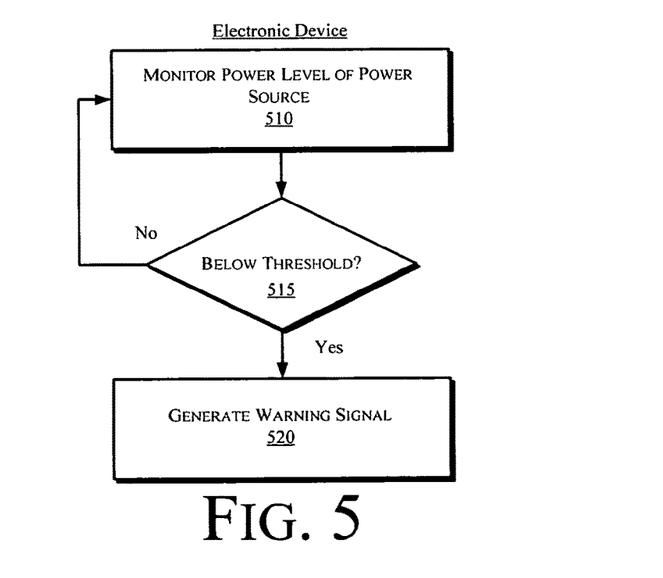

Having described various structural components of examples of a heatstroke safety system, operations implemented by the system will be described with reference to FIGS. 3-5. Referring first to FIG. 3, at operation 310 the electronic device 100 monitors sensor outputs. For example, the electronic device 100 may be positioned in the cabin of a vehicle 200 as depicted in FIG. 2 and may monitor sensors such as the temperature sensor 120, the carbon dioxide sensor 122, and/or the carbon monoxide sensor 124. Outputs from these sensors may be received by the controller 140.

At operation 315 the controller may determine, based on inputs from at least one of the motion sensor 110, the location sensor 112, the temperature sensor 120, or the air quality sensor 122/124, whether a dangerous condition exists in a region proximate the electronic device 100. By way of example, controller 140 may monitor air temperature and concentrations of carbon dioxide and/or carbon monoxide in the cabin. If the air temperature exceeds a threshold (e.g., 180 degrees) and/or the carbon dioxide level exceeds a threshold (e.g., 30,000 parts per million (ppm)) and/or the carbon monoxide level exceeds a threshold (e.g., 70 ppm) then a dangerous condition may be determined to exist in the cabin.

If, at operation 315, the controller determines that a dangerous condition does not exist then control passes back to operation 310 and the controller 140 continues to monitor the sensor outputs. By contrast, if at operation 315 the controller 140 determines that a dangerous condition exists then control passes to operation 320 and the controller 140 generates a warning signal. In embodiments in which the alarm module 160 is physically separate from the electronic device 100 the warning signal may be transmitted (operation 325) from one or more of the communication interfaces 130 on the electronic device 100 and, operation 330, received in the alert module 160 via one or more of the communication interfaces 180.

At operation 335, in response to the warning signal generated by the controller 140, the alert module 160 generates at least one of an audible alarm using the audible alarm module 170, a visual alarm using the visual alarm module 172, or a motion-based alarm using the vibrator assembly 174, or combinations thereof. In some examples the alert module 160 may be configured to activate a siren or other audible alarm to alert persons proximate the vehicle that a dangerous condition exists in the vehicle. Further, the alert module 160 may be configured to generate a visual alarm such as a flashing light or the like. Further, the alert module 160 may be configured to active a vibration assembly such as the vibration assembly 174 depicted in FIG. 2. In such examples the vibration assembly 174 may vibrate portions of the vehicle with sufficient force to cause the vehicle's alarm system to activate.

At operation 340, in response to the warning signal generated by the controller 140, the alert module initiates a communication to a remote communication device. In some examples the remote communication device comprises an emergency response service 192. In such examples the controller 162 in the alert module 160 may query the electronic device 100 to request a location from the location sensor 112 of the electronic device. The electronic device 100 may respond with a location indicator, e.g., a GPS coordinate, for the electronic device. The location indicator may be transmitted to the emergency response service in the communication from the alert module. Additional information, e.g., a make, model, description, and license plate number of the vehicle and contact information for an owner of the vehicle may also be included in the communication to the emergency response service to facilitate locating the vehicle and the vehicle's owner.

In further examples the remote communication device comprises a vehicle alarm 194. By way of example, alert module 160 may be configured to communicate with the vehicle's security system to trigger the vehicle alarm.

In further examples the remote communication device comprises one or more mobile phones 194. By way of example, alert module 160 may be configured to send a message (e.g., a text message) or place a phone call to a phone number, e.g., a phone belonging to the owner of the vehicle. In other examples the remote communication device may comprise a mobile service operator. In such examples the communication may include location data and/or vehicle description data as described above, and the mobile service operator may generate and transmit an emergency response message to mobile devices proximate to the location of the electronic device.

At operation 345 the alert module 160 activates one or more actuators. In some examples the actuators may comprise a vibrator assembly 174 which is configured to trigger a vehicle alarm, as described above. In another example the alert module 160 may be mounted to a vehicle window and may include a window punch 176 capable to break the vehicle window and an actuator 178 which, in response to the warning signal, forces the window punch 176 against the vehicle window. In such examples the alert module 160 may comprise a display to present data from at least one of the plurality of sensors. For example, the alert module may display a message on the display requesting help from persons proximate the vehicle.

In some examples the alert module 160 may implement series of escalating responses to different danger thresholds and/or lags in response times. For example, if a dangerous condition is detected an alarm may be triggered immediately. If there's no response to the alarm within a predetermined time period or if the dangerous condition worsens, then a call may be placed to emergency services. Again, if there's no response for a predetermined time period or if the dangerous condition worsens, then the window punch may be actuated to break the window.

In some examples the electronic device may utilize data from the motion sensor 110, the location sensor 112, and/or the carbon monoxide sensor to adjust a rate at which the controller 140 samples data from the various sensors on the electronic device. Referring to FIG. 4, at operation 410 the controller 140 monitors outputs of the motion sensor 110 and/or the location sensor 112. Based on data from the motion sensor 110 and the location sensor 112 the controller 140 determines (operation 415) whether the electronic device 100 is in motion or in a predetermined location known to be safe, or whether the vehicle is unoccupied (e.g., by determining the carbon dioxide content of the ambient air in the cabin).

If, at operation 415, the controller makes a determination that the electronic device 100 is in motion, in a predetermined location, or unoccupied, then control passes to operation 420 and the controller 140 samples sensor data at a first sampling rate. By way of example, if the controller determines that the vehicle is in motion, in a predetermined location deemed to be safe, or is unoccupied then the controller may place the electronic device 100 in a low-power consumption mode in which the controller 140 reduces the sampling rate for sampling data from the sensors, thereby reducing power consumption by the electronic device 100.

By contrast, if at operation 415 the controller makes a determination that the electronic device 100 is not in motion, in a predetermined location, or unoccupied, then control passes to operation 420 and the controller 140 samples sensor data at a second sampling rate. By way of example, if the controller determines that the vehicle is not in motion, in a predetermined location deemed to be safe, or is occupied then the controller may place the electronic device 100 in a normal power consumption mode in which the controller 140 increases the sampling rate for sampling data from the sensors. In some examples, the escalation of warnings and/or responses can also be adjusted depending on whether the vehicle is in motion, at a predetermined location, or unoccupied.

In further examples the electronic device may include a power source 150 and a power management module 152 to monitor a power level of the power source and to generate a warning signal when the power level of the power source falls below a threshold. Referring to FIG. 5, at operation 510 the power management module 152 may monitor a power level of the power source 150. If, at operation 515 the power level of the power source 150 is below a threshold then control passes to operation 520 and the electronic device may generate a warning signal to indicate that the power source is low and needs to be replaced and/or recharged. The warning signal may be presented via the audible alarm 170, the visual alarm 172 and/or the vibrator assembly 174.

Figure 6:
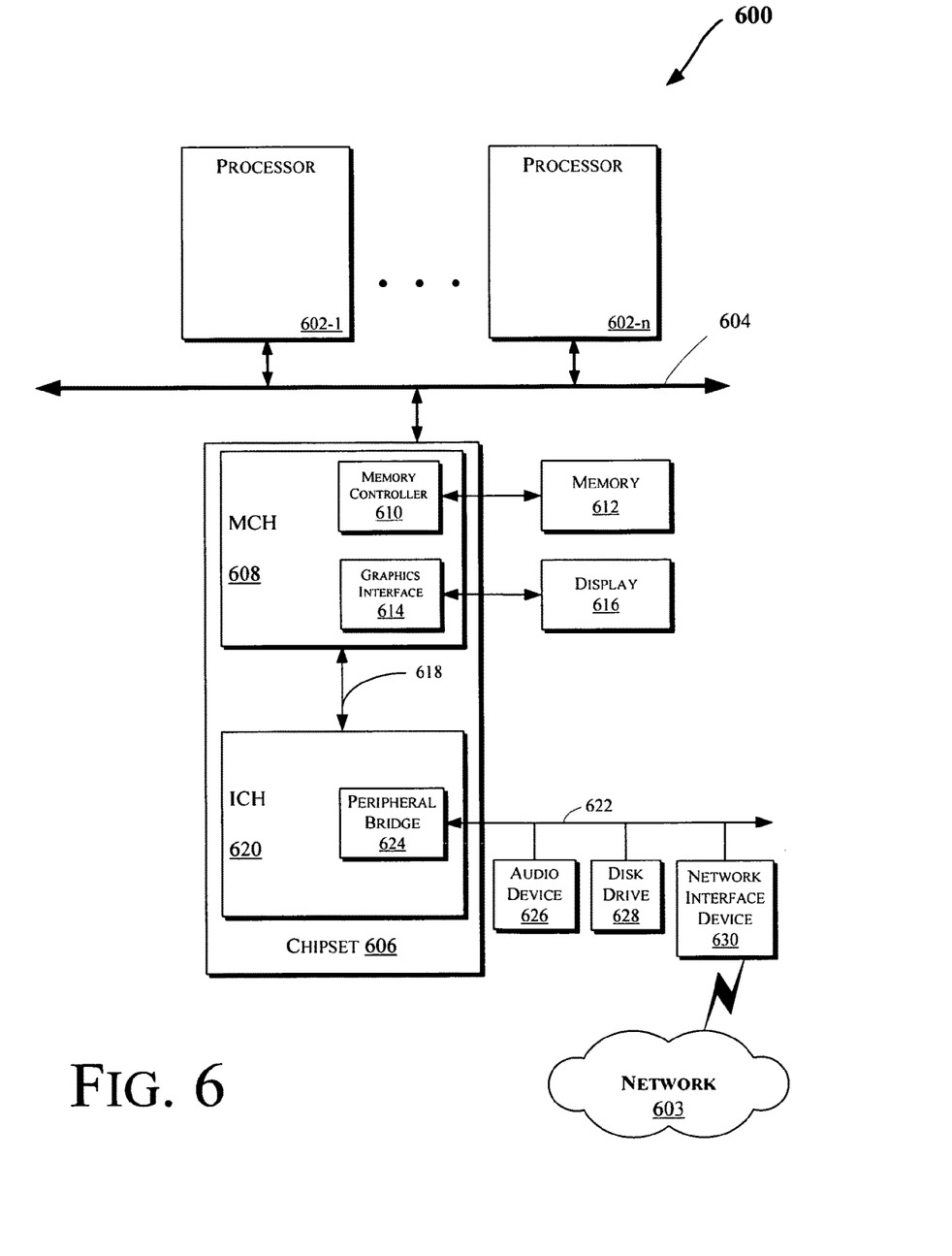
FIGS. 6-10 are schematic illustrations of electronic devices which may be adapted for use in a heatstroke safety system in accordance with some examples.

Thus, described herein are examples of a heatstroke safety system which may be used in enclosed environments such as vehicles. As described above, in some examples the electronic device may be embodied as a computer system. FIG. 6 illustrates a block diagram of a computing system 600 in accordance with an example. The computing system 600 may include one or more central processing unit(s) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors.

A chipset 606 may also communicate with the interconnection network 604. The chipset 606 may include a memory control hub (MCH) 608. The MCH 608 may include a memory controller 610 that communicates with a memory 612. The memory 412 may store data, including sequences of instructions, that may be executed by the processor 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processor(s) and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics accelerator 616 may be included within the MCH 608 in other examples.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
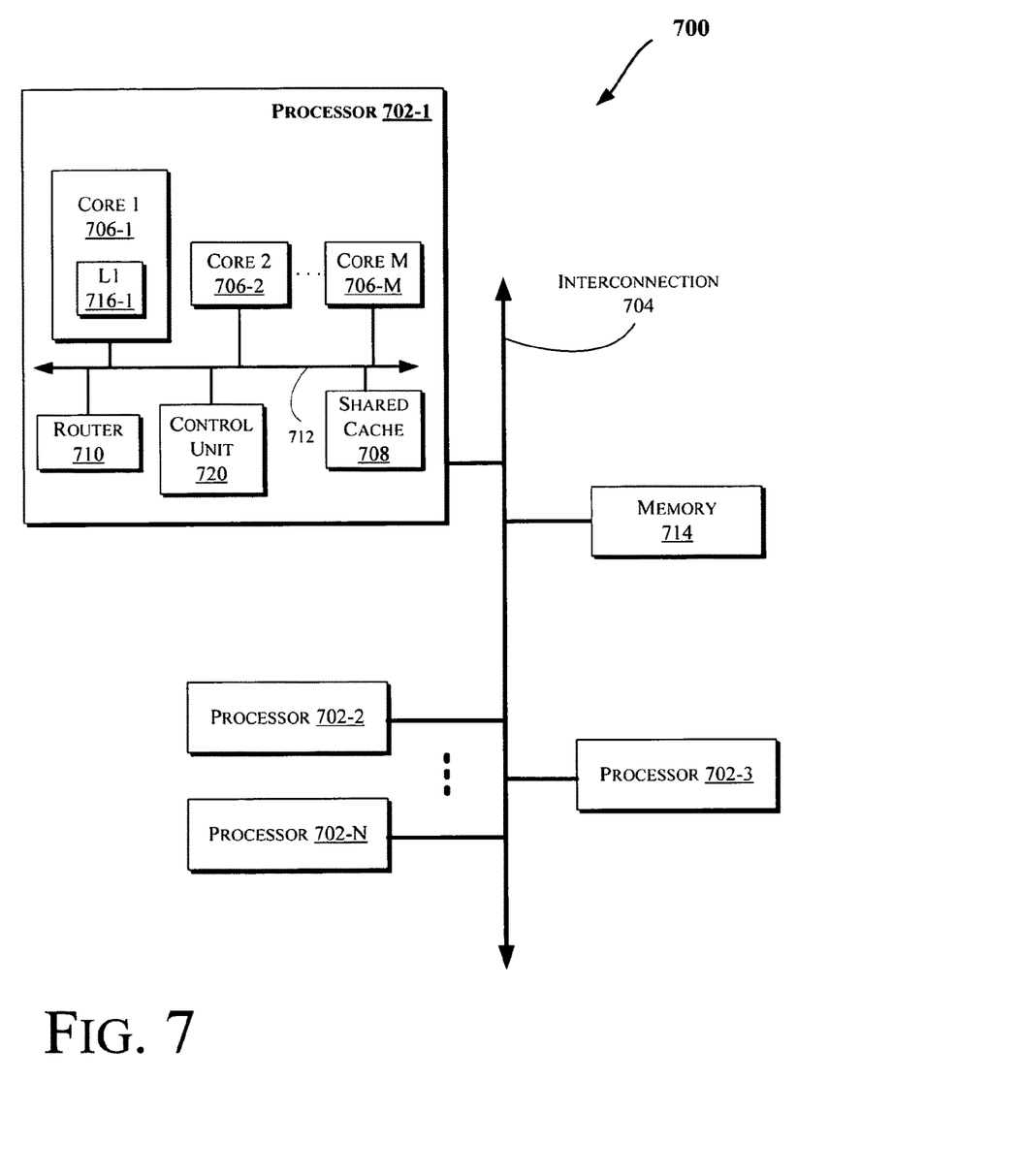

FIG. 7 illustrates a block diagram of a computing system 700, according to an example. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716").

Figure 8:
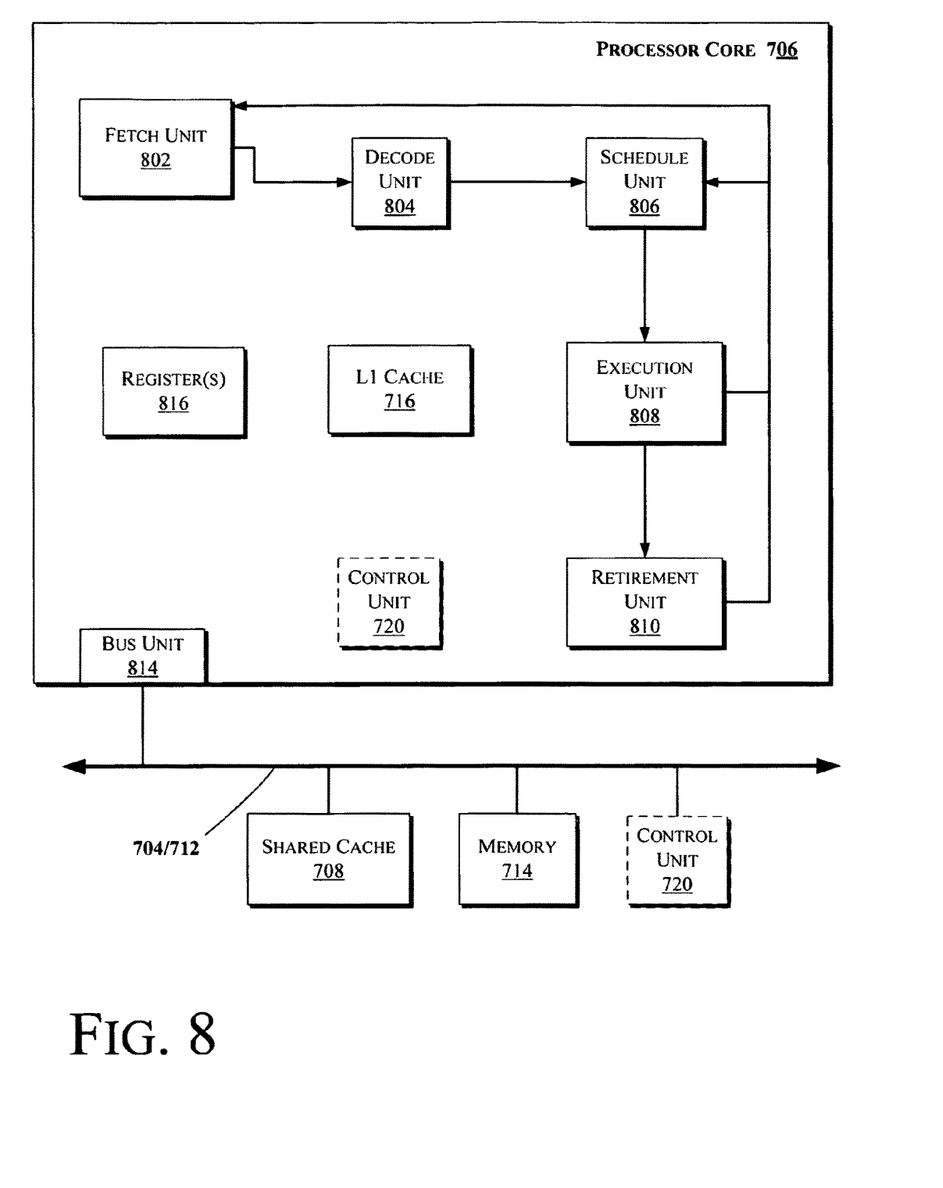

FIG. 8 illustrates a block diagram of portions of a processor core 706 and other components of a computing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
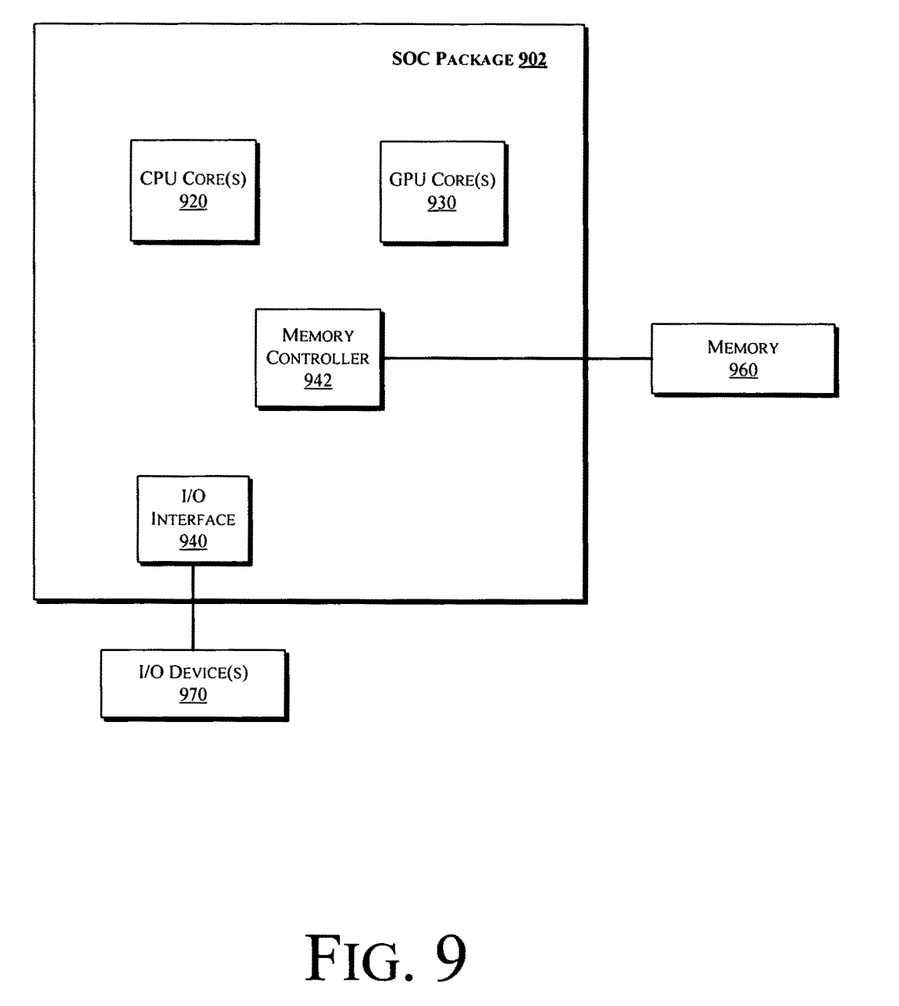

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more processor cores 920, one or more graphics processor cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch surface, a speaker, or the like.

Figure 10:
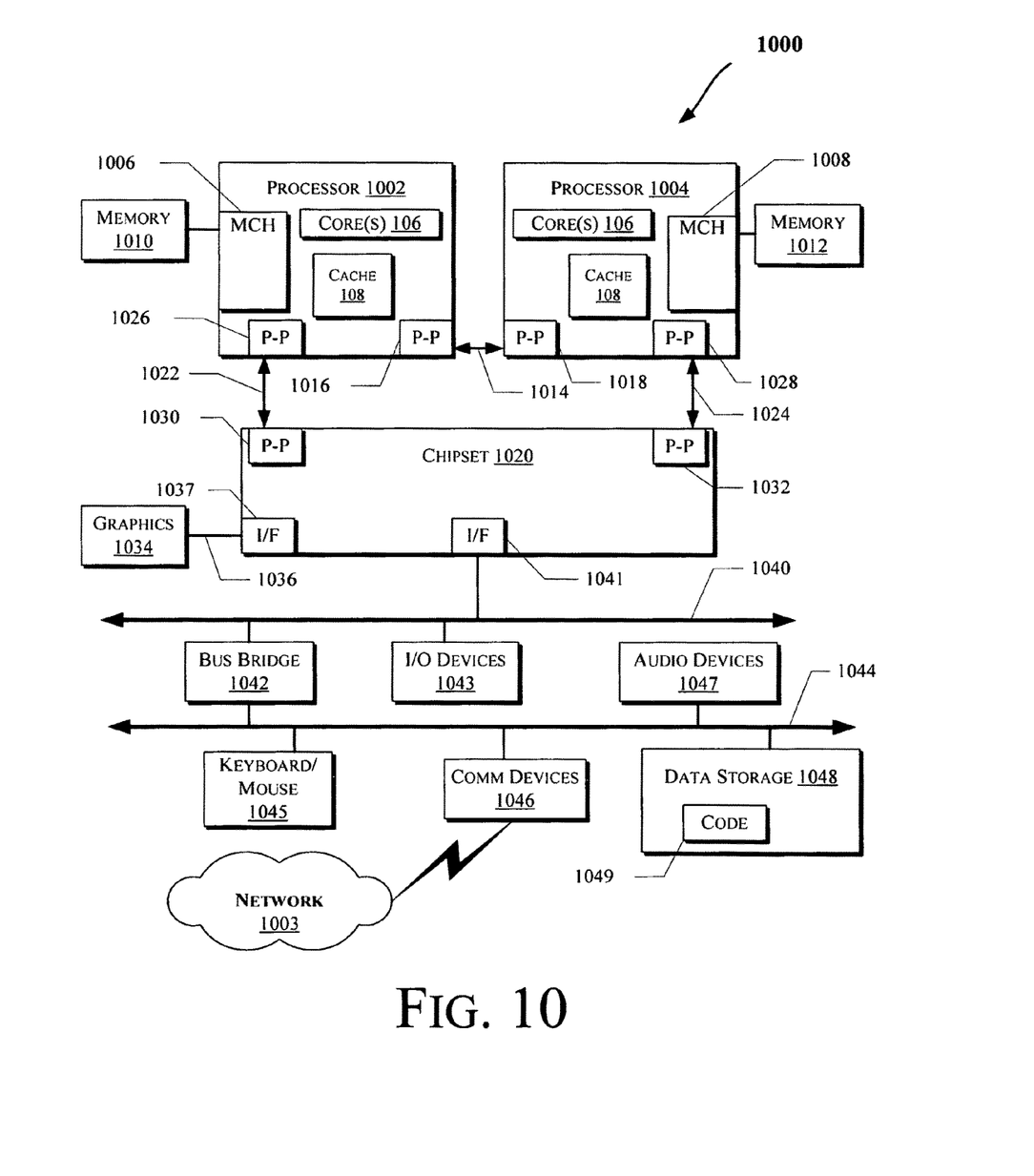

FIG. 10 illustrates a computing system 1000 that is arranged in a point-to-point (PtP) configuration, according to an example. In particular, FIG. 10 shows a system where processors, memory, and input/output devices are interconnected by a number of point-to-point interfaces. As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012.

In an example, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following examples pertain to further examples.

Example 1 is an electronic device, comprising a plurality of sensors comprising at least one of a motion sensor, a location sensor, a temperature sensor, and an air quality sensor, and a controller communicatively coupled to the plurality of sensors and comprising processing circuitry to determine, based on inputs from at least one of the motion sensor, the location sensor, the temperature sensor or the air quality sensor, whether a dangerous condition exists in an enclosed space proximate the electronic device and in response to a determination that a dangerous condition exists in a region proximate the electronic device, to generate a warning signal.

In Example 2, the subject matter of Example 1 can optionally include an arrangement in which the controller comprises processing circuitry to determine, based on an input from at least one of the motion sensor or the location sensor, whether the electronic device is in motion or in a first predetermined location and in response to a determination that the electronic device is in motion or in a first predetermined location, to place the electronic device in a low-power consumption mode.

In Example 3, the subject matter of any one of Examples 1-2 can optionally include an arrangement in which the controller comprises processing circuitry to sample data from at least one of the plurality of sensors at a first sampling rate in response to a determination that the electronic device is in motion or in a first predetermined location.

In Example 4, the subject matter of any one of Examples 1-3 can optionally include an arrangement in which the controller comprises processing circuitry to sample data from at least one of the plurality of sensors at a second sampling rate, different than the first sampling rate, in response to a determination that the electronic device is not in motion or is in a second predetermined location.

In Example 5, the subject matter of any one of Examples 1-4 can optionally include an alert module communicatively coupled to the controller and comprising at least one of an audible alarm module, a visual alarm module, or a vibrator assembly, and wherein, in response to the warning signal generated by the controller, the alert module generates at least one of an audible alarm using the audible alarm module, a visual alarm using the visual alarm module, or a motion-based alarm using the vibrator assembly.

In Example 6, the subject matter of any one of Examples 1-5 can optionally include an arrangement wherein the alert module further comprises a communication interface, and wherein, in response to the warning signal generated by the controller, the alert module initiates a communication to a remote communication device.

In Example 7, the subject matter of any one of Examples 1-6 can optionally include an arrangement wherein the remote communication device comprises an emergency response service and wherein the communication includes location data provided by the location sensor.

In Example 8, the subject matter of any one of Examples 1-7 can optionally include an arrangement wherein the remote communication device comprises a vehicle alarm.

In Example 9, the subject matter of any one of Examples 1-8 can optionally include an arrangement wherein the remote communication device comprises a mobile phone, and wherein the communication includes a location data provided by the location sensor and information identifying a vehicle in which the electronic device resides.

In Example 10, the subject matter of any one of Examples 1-9 can optionally include an arrangement in which a wireless communication interface communicatively coupled to the controller, and wherein the alert module is physically separate from the electronic device and communicatively coupled to the electronic device by the wireless communication interface.

In Example 11, the subject matter of any one of Examples 1-10 can optionally include an arrangement in which wherein the vibrator assembly in the alert module is configured to trigger a vehicle alarm.

In Example 12, the subject matter of any one of Examples 1-11 can optionally include an arrangement in which the alert module is mounted to a vehicle window and comprises a window punch capable to break the vehicle window and an actuator which, in response to the warning signal, forces the window punch against the vehicle window.

In Example 13, the subject matter of any one of Examples 1-12 can optionally include an arrangement wherein the alert module comprises a display to present data from at least one of the plurality of sensors.

In Example 14, the subject matter of any one of Examples 1-13 can optionally include an arrangement wherein the air quality sensor comprises at least one of a carbon dioxide sensor or a carbon monoxide sensor.

In Example 15, the subject matter of any one of Examples 1-14 can optionally include a power source, and a power management module comprising processing circuitry to monitor a power level of the power source and to generate a warning signal when the power level of the power source falls below a threshold.

Example 16 is a controller comprising processing circuitry to determine, based on inputs from at least one of a motion sensor, a location sensor, a temperature sensor, or an air quality sensor, whether a dangerous condition exists in a region proximate the controller, and in response to a determination that a dangerous condition exists in a region proximate the controller, to generate a warning signal.

In Example 17, the subject matter of Example 16 can optionally include processing circuitry to determine, based on an input from at least one of the motion sensor or the location sensor, whether the controller is in motion or in a first predetermined location, and in response to a determination that the controller is in motion or in a first predetermined location, to place an electronic device in a low-power consumption mode.

In Example 18, the subject matter of any one of Examples 16-17 can optionally include processing circuitry to sample data from at least one of the temperature sensor, or the air quality sensor at a first sampling rate in response to a determination that the controller is in motion or in a first predetermined location.

In Example 19, the subject matter of any one of Examples 16-18 can optionally include processing circuitry to sample data from at least one of temperature sensor, or the air quality sensor at a second sampling rate, different than the first sampling rate, in response to a determination that the controller is not in motion or is in a second predetermined location.

Example 20 is a non-transitory machine readable medium comprising instructions which, when executed by a controller, configure the controller to determine, based on inputs from at least one of a motion sensor, a location sensor, a temperature sensor, or an air quality sensor, whether a dangerous condition exists in an enclosed space proximate the controller and in response to a determination that a dangerous condition exists in a region proximate the controller, to generate a warning signal In Example 21, the subject matter of Example 20 can optionally include instructions which, when executed by a controller, configure the controller to determine, based on an input from at least one of the motion sensor or the location sensor, whether the controller is in motion or in a first predetermined location, and in response to a determination that the controller is in motion or in a first predetermined location, to place an electronic device in a low-power consumption mode.

In Example 22, the subject matter of any one of Examples 20-21 can optionally include instructions which, when executed by a controller, configure the controller to sample data from at least one of the temperature sensor, or the air quality sensor at a first sampling rate in response to a determination that the controller is in motion or in a first predetermined location.

In Example 23, the subject matter of any one of Examples 20-22 can optionally include instructions which, when executed by a controller, configure the controller to sample data from at least one of temperature sensor, or the air quality sensor at a second sampling rate, different than the first sampling rate, in response to a determination that the controller is not in motion or is in a second predetermined location.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An electronic device, comprising:
   a plurality of sensors comprising at least one of a motion sensor, a location sensor, a temperature sensor, and an air quality sensor; and
   a controller communicatively coupled to the plurality of sensors and comprising processing circuitry to:
      determine, based on inputs from at least one of the motion sensor, the location sensor, the temperature sensor or the air quality sensor, whether a dangerous condition exists in an enclosed space proximate the electronic device;
      in response to a determination that a dangerous condition exists in a region proximate the electronic device, to generate a warning signal;
   an alert module communicatively coupled to the controller and comprising at least one of an audible alarm module, a visual alarm module, or a vibrator assembly, and
   wherein, in response to the warning signal generated by the controller, the alert module generates at least one of an audible alarm using the audible alarm module, a visual alarm using the visual alarm module, or a motion-based alarm using the vibrator assembly; and
   a wireless communication interface communicatively coupled to the controller, and wherein the alert module is physically separate from the electronic device and communicatively coupled to the electronic device by the wireless communication interface, wherein the alert module is mounted to a vehicle window and comprises a window punch capable to break the vehicle window and an actuator which, in response to the warning signal, forces the window punch against the vehicle window.

2. The electronic device of claim 1, wherein the controller comprises processing circuitry to:
   determine, based on an input from at least one of the motion sensor or the location sensor, whether the electronic device is in motion or in a first predetermined location; and
   in response to a determination that the electronic device is in motion or in a first predetermined location, to place the electronic device in a low-power consumption mode.

3. The electronic device of claim 2, wherein the controller comprises processing circuitry to sample data from at least one of the plurality of sensors at a first sampling rate in response to a determination that the electronic device is in motion or in a first predetermined location.

4. The electronic device of claim 2, wherein the controller comprises processing circuitry to sample data from at least one of the plurality of sensors at a second sampling rate, different than the first sampling rate, in response to a determination that the electronic device is not in motion or is in a second predetermined location.

5. The electronic device of claim 1, wherein the alert module further comprises a communication interface, and wherein, in response to the warning signal generated by the controller, the alert module initiates a communication to a remote communication device.

6. The electronic device of claim 5, wherein the remote communication device comprises an emergency response service and wherein the communication includes location data provided by the location sensor.

7. The electronic device of claim 5, wherein the remote communication device comprises a vehicle alarm.

8. The electronic device of claim 5, wherein the remote communication device comprises a mobile phone, and wherein the communication includes a location data provided by the location sensor and information identifying a vehicle in which the electronic device resides.

9. The electronic device of claim 1, wherein the vibrator assembly in the alert module is configured to trigger a vehicle alarm.

10. The electronic device of claim 1, wherein the alert module comprises a display to present data from at least one of the plurality of sensors.

11. The electronic device of claim 1, wherein the air quality sensor comprises at least one of a carbon dioxide sensor or a carbon monoxide sensor.

12. The electronic device of claim 1, further comprising:
   a power source; and
   a power management module comprising processing circuitry to monitor a power level of the power source and to generate a warning signal when the power level of the power source falls below a threshold.

* * * * *